(12) United States Patent
Heyder

(10) Patent No.: US 8,313,357 B2
(45) Date of Patent: Nov. 20, 2012

(54) METHOD FOR THE PRODUCTION OF A WORKPIECE AND GRINDING MACHINE

(75) Inventor: Hans-Juergen Heyder, Lautertal (DE)

(73) Assignee: Kapp GmbH, Coburg (DE)

( * ) Notice: Subject to any disclaimer, the term of this patent is extended or adjusted under 35 U.S.C. 154(b) by 665 days.

(21) Appl. No.: 12/511,488

(22) Filed: Jul. 29, 2009

(65) Prior Publication Data

US 2010/0029183 A1    Feb. 4, 2010

(30) Foreign Application Priority Data

Jul. 30, 2008  (DE) .......................... 10 2008 035 525

(51) Int. Cl.
*B24B 5/04* (2006.01)
*B24B 19/02* (2006.01)

(52) U.S. Cl. ............................. 451/10; 451/47; 451/73

(58) Field of Classification Search .................... 451/10, 451/5, 47, 48, 57, 65, 73
See application file for complete search history.

(56) References Cited

U.S. PATENT DOCUMENTS

| | | | | |
|---|---|---|---|---|
| 3,579,315 A | * | 5/1971 | Hufendick | ........................ 451/48 |
| 4,109,362 A | * | 8/1978 | Ingalls | ..................... 29/888.023 |
| 4,170,164 A | * | 10/1979 | Nelson | ............................ 409/13 |
| 5,806,182 A | * | 9/1998 | Tateno et al. | ............. 29/888.023 |
| 7,040,845 B2 | * | 5/2006 | Matsumoto et al. | .......... 409/132 |
| 7,216,407 B2 | * | 5/2007 | Yonemaru | ..................... 29/27 C |

FOREIGN PATENT DOCUMENTS

| | | |
|---|---|---|
| DE | 199 18 289 | 10/2000 |
| DE | 203 20 294 | 4/2004 |
| DE | 20 2005 014619 | 12/2005 |
| DE | 20 2005 014 619 | 2/2006 |
| JP | 53 075514 A | 7/1978 |
| JP | 62 218063 A | 9/1987 |

* cited by examiner

*Primary Examiner* — Robert Rose
(74) *Attorney, Agent, or Firm* — Lucas & Mercanti, LLP

(57) ABSTRACT

The invention relates to a method for the production of a rotor of a rotary screw compressor (1) with a cylindrical basic shape, which has a helical profile (2) at its outer circumference, wherein the method comprises the steps of: a) Pre-processing of the workpiece (1) by bringing in the profile (2), wherein the profile (2) has a stock compared with the finished shape, b) Pre-grinding of the profile (2) by a rough-machining process in a grinding machine, wherein a part of the stock is removed and c) Finish-grinding of the profile (2) by a finish-machining process in the grinding machine, wherein the remainder of the stock is removed and the finished shape of the profile (2) is produced. To improve the efficiency of the production especially of rotors of rotary screw compressors and ensure a high quality of the production the invention is characterized in that the pre-grinding and/or the finish-grinding is carried out with a grinding worm (3) by a continuous generative grinding process.

19 Claims, 1 Drawing Sheet

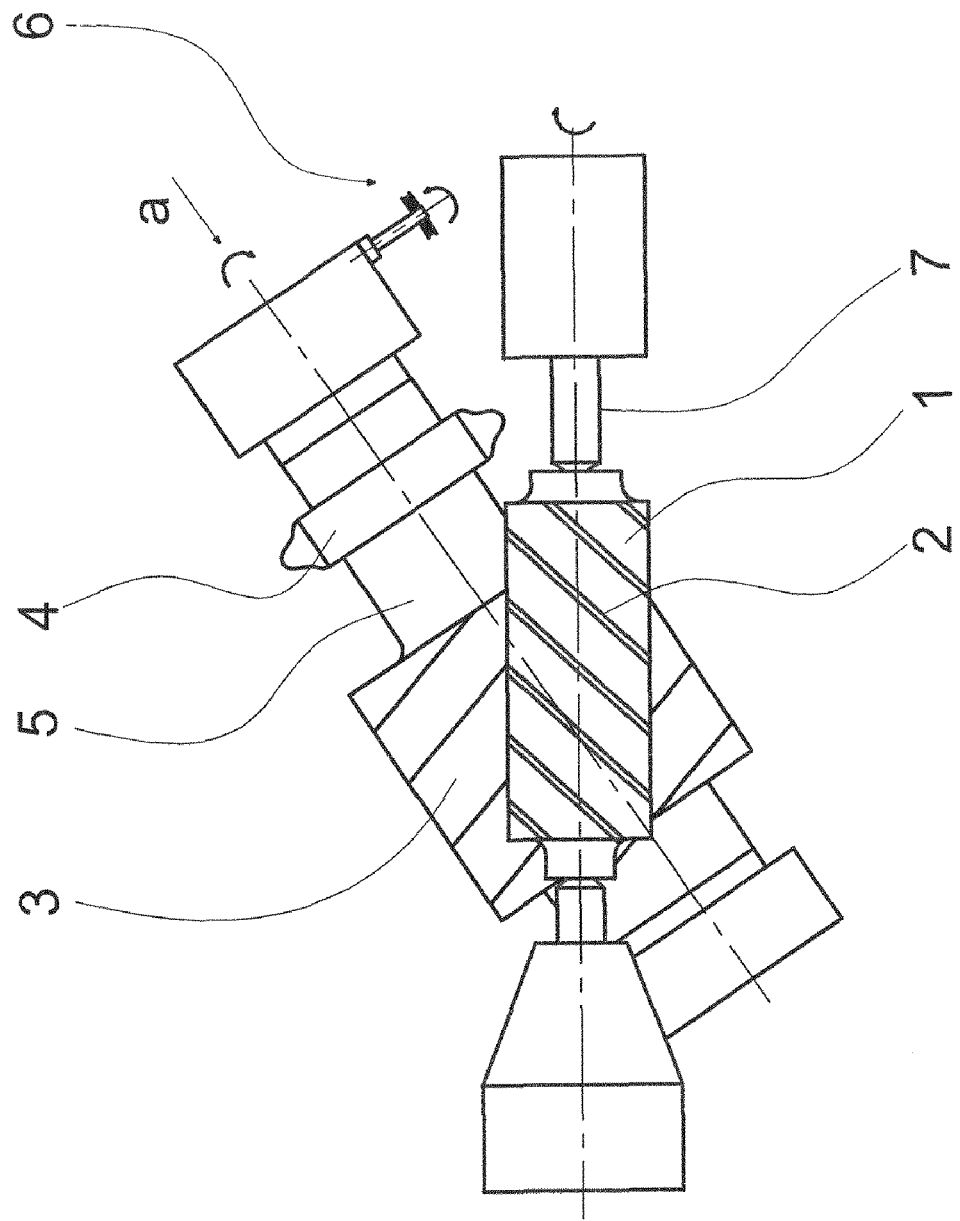

METHOD FOR THE PRODUCTION OF A WORKPIECE AND GRINDING MACHINE

This application claims the priority of DE 10 2008 035 525.9 filed Jul. 30, 2008, and is incorporated by reference herein.

The invention relates to a method for the production of a workpiece in the form of a rotor of a rotary screw compressor, with a cylindrical basic shape, which has a helical profile at its outer circumference, wherein the method comprises the steps of: a) Pre-processing of the workpiece by bringing in the profile, wherein the profile has a stock compared with the finished shape, b) Pre-grinding of the profile by a rough-machining process in a grinding machine, wherein a part of the stock is removed and c) Finish-grinding of the profile by a finish-machining process in the grinding machine, wherein the remainder of the stock is removed and the finished shape of the profile is produced. Furthermore, the invention relates to a grinding machine.

Rotors in rotary screw compressors are required which have a substantial cylindrical outer contour, wherein a helical profile is brought into the outer circumference. Two rotors which are complementary with respect to the profiles ("male" and "female") are in contact during the operation of the compressor in such a way that a gas flow is produced by the rotation of the rotors which is used for the generation of a pressure.

Thereby, it is necessary for obtaining a high degree of efficiency of the compressor that the profiles are brought into the rotors with a high precision so that leakage loss remains small.

Thus, it is known to produce rotors of the mentioned kind in a way as described above. Accordingly, the rotor is firstly pre-processed by a pre-processing step, e.g. by shape cutting (turning, milling) from the massive material or by primary shaping (casting), so that the profile is substantially existing but that it has a certain stock compared with the finished shape.

Then, the precise forming is effected in a grinding machine by a two-step grinding process. Accordingly, the bigger part of the stock is removed by a first grinding step (rough-machining). In a further subsequent grinding step (finish-machining) the final shape of the profile is produced, wherein here only the remainder of the stock is grinded. Thereby, for the rough grinding and for the finish grinding profile grinding wheels are employed which reproduce the profile by guiding the grinding tool through the profile gap in the workpiece.

The division of the machining process into rough-machining and finish-machining is also known in the field of gearing production. DE 20 2005 014 619 U1 suggests the use of a rough-machining hob and of a finish-machining hob for the production of helical gears.

According to DE 203 20 294 U1 gears are machined from a green body by hobbing; burr which comes into being by this process is removed by means of a disc-shaped deburring tool.

DE 199 18 289 A1 discloses for the production of geared workpieces in a first step a hobbing process, wherein a fine machining process follows in a second step. The workpiece remains in the same clamping device during both machining steps.

The division of the grinding process into rough-machining and finish-machining increases the efficiency of the process already considerably.

It is disadvantageously that still high costs arise for the production of the mentioned rotors of rotary screw compressors and similar workpieces, because a respective time is required for obtaining a high precision. Furthermore, it is necessary that the grinded rotor is subject to postprocessing. Here, burr has to be removed which emerged from grinding. For doing so, separate deburring machines can be employed; alternatively manual deburring can be carried out which increases the production cost accordingly.

Thus, it is an object of the present invention to further develop a method of the kind mentioned above and to propose a respective grinding machine by which it becomes possible to make the production of rotors of rotary screw compressors and of similar profiles more economical.

The solution of this object according to the invention is—with respect to the method—characterized in that the pre-grinding and/or the finish-grinding is carried out with a grinding worm by a continuous generative grinding process.

So far, the production of rotors of rotary screw compressors by generative grinding is unknown.

Preferably only the pre-grinding is carried out with a grinding worm by a continuous generative grinding process, while the finish-grinding is carried out with a profile grinding wheel by a profile grinding process.

A dressable tool can be used as the rough-machining tool and/or as the finish-machining tool. But it is also possible that a tool with a base body made from steel is used as rough-machining tool and/or as finish-machining tool on which a layer of abrasive material is arranged, especially a layer of cubic boron nitride (CBN).

The rough-machining tool and the finish-machining tool can be arranged on a common tool spindle which is shifted in axial direction for changing the engagement between the rough-machining tool and the finish-machining tool.

A specifically preferred embodiment of the invention is characterized in that after the accomplishment of step of finish-machining a debuting process is carried out in the grinding machine at the grinded profile. The deburring process can be carried out by one or more rotating brushes which are positioned in the region of the workpiece which has to be deburred. Preferably the workpiece rotates during the deburring process around its axis.

The grinding machine for grinding the mentioned workpiece, especially a rotor of a rotary screw compressor, is characterized in that the grinding machine has a tool spindle on which a rough-machining tool being a grinding worm and a finish-machining tool being a profile grinding wheel is arranged in axial distance, wherein furthermore a deburring tool for the removal of burr at the grinded workpiece is arranged and wherein the deburring tool is a rotating brush.

The rough-machining tool and/or the finish-machining tool can be dressable tools. Alternatively, the rough-machining tool and/or the finish-machining tool can be tools with a base body made from steel on which a layer of abrasive material is arranged, especially a layer of cubic boron nitride (CBN).

The rough-machining tool and the finish-machining tool are preferably arranged on a common tool spindle which is arranged axially shiftable in the grinding machine.

Thus, the grinding machine has one or more deburring tools for the removal of burr at the grinded workpiece in the form of rotating brushes.

A preferred design has a workpiece spindle which is arranged horizontally.

With the proposed method and the respective grinding machine it becomes possible to produce especially rotors of rotary screw compressors more cost efficient as yet. The method is also suitable for similar workpieces with a helical profile at its circumference of the substantial cylindrical base body of the workpiece.

The method can be carried out with dressable grinding tools or with non-dressable grinding tools, wherein a base body made from steel is employed in the latter case which is coated with a layer of abrasive grains on an exactly machined profile, wherein a galvanic connection of CBN is preferred.

Thereby, the rough-machining tool is furnished with a bigger (coarse) grinding grain than the finish-machining tool. There, the grain for the finish-machining process is selected so that the demanded surface quality is achieved.

The rough-machining grinding and the finish-machining grinding take place in a single clamping of the workpiece.

The final operation is the deburring of the face surface of the rotors, which is carried out preferably in the same clamping of the workpiece in the grinding machine with a deburring tool (rotating brush).

The inventive connection of generative grinding with a grinding worm for rough-machining and of profile grinding with a profile grinding wheel for finish-machining in one clamping combines the advantages of a shorten machining time of the generative grinding with the higher precision of the profile grinding.

Thus, compared with the pre-known production process shorter machining times can be achieved without loss with respect to the precision and the surface quality.

By the deburring process, which is integrated into the grinding machine, no separate deburring machine is necessary and any manual deburring process is redundant respectively. This also causes that the production costs are reduced.

In the drawings an embodiment of the invention is illustrated. The sole FIGURE shows schematically the front view of a workspace of a grinding machine, in which a rotor of a rotary screw compressor is subject to a final machining.

In the FIGURE a workpiece 1 being a rotor of a rotary screw compressor is depicted, which was already pre-processed before it is transferred into the grinding machine. Consequently, the rotor 1 has a helical profile 2 at the circumference of its cylindrical outer contour. In the depicted grinding machine the complete finish machining process of the rotor 1 takes place, consisting of a rough-machining process and a finish-machining process as well as a deburring process.

A tool spindle 5 which is shown in the FIGURE is equipped with two grinding tools 3 and 4.

The rough-machining tool is a grinding worm 3, which is profiled in such a way that during continuous homing of the worm profile within the profile 2 to be machined the bigger part of the stock is removed by generative grinding.

The finish-machining tool is a profile grinding wheel 4, which has—as pre-known—the contour to exactly machine the helical gap of the profile 2. The grinding worm 3 and the profile grinding wheel 4 are designed as tools having a steel base body in the present case. I.e. they have a base body made from steel which is exactly machined and which is coated with a single layer of cubic boron nitride (CBN), wherein the CBN grains are fixed at the steel base body with a connection metal (nickel) by a galvanic process.

The rough-machining tool 3 and the finish-machining tool 4 are in engagement alternatively. The change between rough-machining and finish-machining is carried out by a movement of the tool spindle 5 in axial direction a.

In the FIGURE the accomplishment of the rough-machining process is depicted. The workpiece 1 is carried on a workpiece spindle 7 between two cone points. The tool spindle 5 and the workpiece spindle 7 are directly driven; their rotation occurs synchronized (electronic coupling).

While the workpiece spindle 7 is oriented horizontally, the tool spindle 5 is pivoted by an angle as it is demanded for the engagement of the tools 3, 4 according to the profile to be generated.

After the rough-machining with the tool 3 is done the finish-machining takes place with the tool 4 as it is pre-known. Afterwards, the deburring of the workpiece 1 takes place automatically in the same clamping of the workpiece by means of one or more deburring tools 6, which is a rotating brush in the present case. Thereby, the brush is positioned in a rotating manner at the front face of the workpiece 1, i.e. at the end of the profile 2, and the workpiece spindle 8 is rotated. By doing so the burr is removed automatically.

As a grinding worm 3 a cylindrical grinding worm is used. It is also possible to use a non-cylindrical worm (globoid grinding worm).

The use of non-dressable grinding tools 3, 4 is not mandatory. It is also possible to use dressable tools, wherein in this case also a respective dressing device has to be arranged in the grinding machine.

The depicted and described process is preferred, i.e. the rough-machining with the grinding worm and the finish-machining with the profile grinding wheel. Generally, it is also possible that the rough-machining and/or the finish-machining are carried out with a grinding worm and with a profile grinding wheel respectively in any combination.

Also, non-dressable and dressable grinding tools can be combined.

Furthermore, it is possible alternatively that the two grinding tools 3, 4 are arranged on separate tool spindles.

A further reasonable alternative is the vertical design in which the workpiece spindle 7 is oriented vertically.

The suggested solution is specifically preferred for smaller rotors as here the biggest possible savings can be reached.

LIST OF REFERENCE NUMERALS 1 workpiece (rotor of rotary screw compressor)
2 helical profile
3 rough-machining tool/grinding worm
4 finish-machining tool/profile grinding wheel
5 tool spindle
6 deburring tool (rotating brush)
7 workpiece spindle
a axial direction

The invention claimed is:

1. Method for the production of a rotor of a rotary screw compressor with a cylindrical basic shape, which has a helical profile at its outer circumference, wherein the method comprises the steps of:
   a) pre-processing of the workpiece by bringing in the profile, wherein the profile has a stock compared with the finished shape,
   b) pre-grinding of the profile by a rough-machining process in a grinding machine, wherein a part of the stock is removed and
   c) finish-grinding of the profile by a finish-machining process in the grinding machine, wherein the remainder of the stock is removed and the finished shape of the profile is produced,
   wherein
   the pre-grinding or the finish-grinding is carried out with a grinding worm by a continuous generative grinding process.

2. Method according to claim 1, wherein the pre-grinding carried out with a grinding worm by a continuous generative grinding process and the finish-grinding is carried out with a profile grinding wheel by a profile grinding process.

3. Method according to claim 1, wherein a dressable tool is used as the rough-machining tool or as the finish-machining tool.

4. Method according to claim 1, wherein a tool with a base body made from steel is used as rough-machining tool or as finish-machining tool on which a layer of abrasive material is arranged, and the layer is cubic boron nitride (CBN).

5. Method according to claim 1, wherein the rough-machining tool and the finish-machining tool are arranged on a common tool spindle which is shifted in axial direction (a) for changing the engagement between the rough-machining tool and the finish-machining tool.

6. Method according to claim 1, wherein after the accomplishment of step a) according claim 1 a deburring process is carried out in the grinding machine at the grinded profile.

7. Method according to claim 6, wherein the deburring process is carried out by one or more rotating brushes which are positioned in the region of the workpiece which has to be deburred.

8. Method according to claim 6 wherein the workpiece rotates during the deburring process around its axis.

9. Method according to claim 1, wherein the workpiece is produced by means of a casting process during step a) of claim 1 or before this step.

10. Grinding machine for grinding of a workpiece with a cylindrical base shape, which has a helical profile at its outer circumference of a rotor of a rotary screw compressor, wherein the workpiece is provided with a profile which is brought in by pre-processing and wherein the profile has a stock compared with the finished shape, for the accomplishment of the method according to claim 1, wherein
the grinding machine has a tool spindle on which a rough-machining tool being a grinding worm, a finish-machining tool being a profile grinding wheel in axial distance, and a deburring tool for the removal of burr at the grinded workpiece is arranged and the deburring tool is a rotating brush.

11. Grinding machine according to claim 10, wherein the rough-machining tool or the finish-machining tool are dressable tools.

12. Grinding machine according to claim 10, wherein the rough-machining tool or the finish-machining tool are tools with a base body made from steel on which a layer of abrasive material is arranged, the layer being cubic boron nitride (CBN).

13. Grinding machine according to claim 10, wherein the rough-machining tool and the finish-machining tool are arranged on a common tool spindle which is arranged axially shiftable in the grinding machine.

14. Grinding machine according to claim 10, the workpiece spindle is arranged horizontally.

15. Method according to claim 1, wherein
the pre-grinding and the finish-grinding are carried out with a grinding worm by the continuous generative grinding process.

16. Method according to claim 3, wherein
the dressable tool is used as the rough-machining tool and the finish-machining tool.

17. Method according to claim 4, wherein
the tool with a base body made from steel is used as a rough-machining tool and as finishing-machining tool on which the layer of cubic boron nitride is arranged.

18. Grinding machine according to claim 11, wherein
the rough-machining tool and the finish-machining tool are dressable tools.

19. Grinding machine according to claim 2, wherein
the rough-machining tool and the finish-machining tool are tools with a base body made from steel on which the layer of cubic boron nitride is arranged.

* * * * *